United States Patent [19]

Struntz

[11] Patent Number: 4,858,365
[45] Date of Patent: Aug. 22, 1989

[54] FISHING ROD HANDGRIPS

[76] Inventor: Bernard J. Struntz, 1002 Woodbridge St., St. Paul, Minn. 55117

[21] Appl. No.: 322,505
[22] Filed: Mar. 13, 1989
[51] Int. Cl.⁴ ............................................ A01K 87/00
[52] U.S. Cl. ............................................ 43/23; 43/22
[58] Field of Search .................. 43/23, 22, 18.1, 25; 30/125

[56] References Cited

U.S. PATENT DOCUMENTS

| | | | |
|---|---|---|---|
| 2,685,755 | 8/1954 | Gorenflo | 43/23 |
| 3,086,311 | 4/1963 | Hurst | 43/25 |
| 4,027,419 | 6/1977 | Popeil | 43/18.1 |
| 4,048,743 | 9/1977 | Lapinski | 43/18.1 |
| 4,796,373 | 1/1989 | Struntz | 43/23 |

Primary Examiner—M. Jordan
Attorney, Agent, or Firm—Jacobson and Johnson

[57] ABSTRACT

The invention comprises an improved handgrip for attachment to either a winter or summer fishing rod that includes a handle with a pivotable knife blade and knife blade guard located in a handle that can be comfortable grasped by the user from a number of different orientations to permit the user to use the handgrip as either a handgrip for a fillet knife or as a handgrip for either a summertime fishing rod or a wintertime fishing rod.

15 Claims, 4 Drawing Sheets

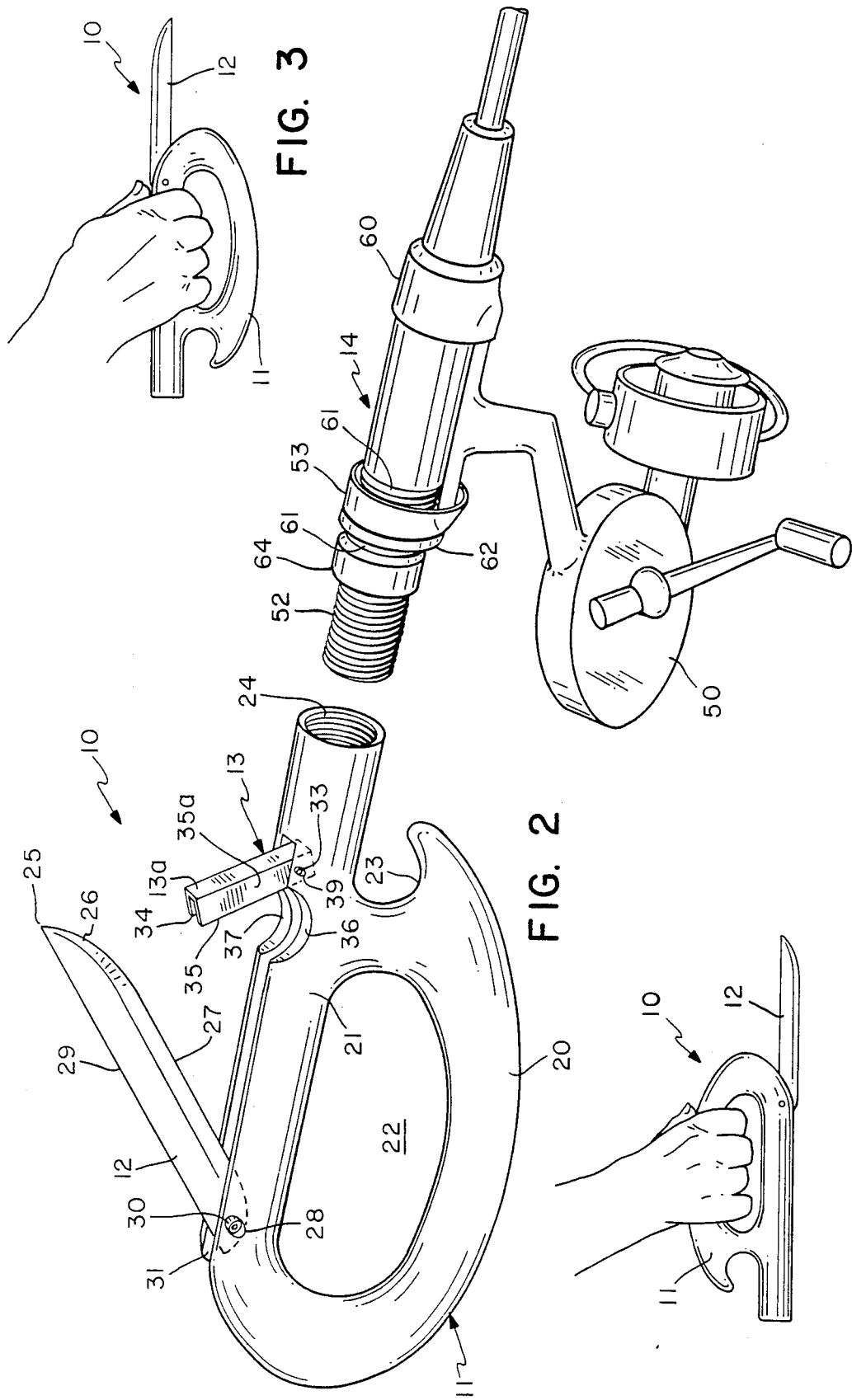

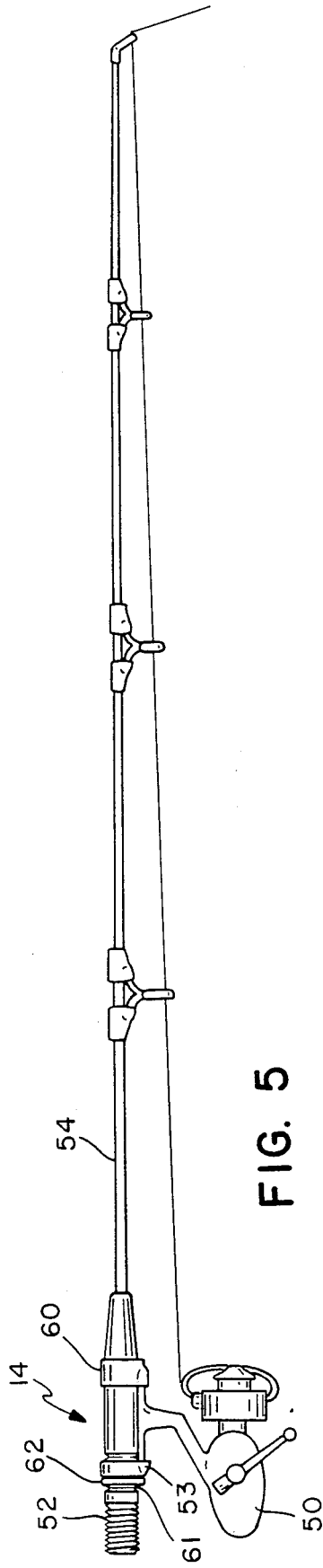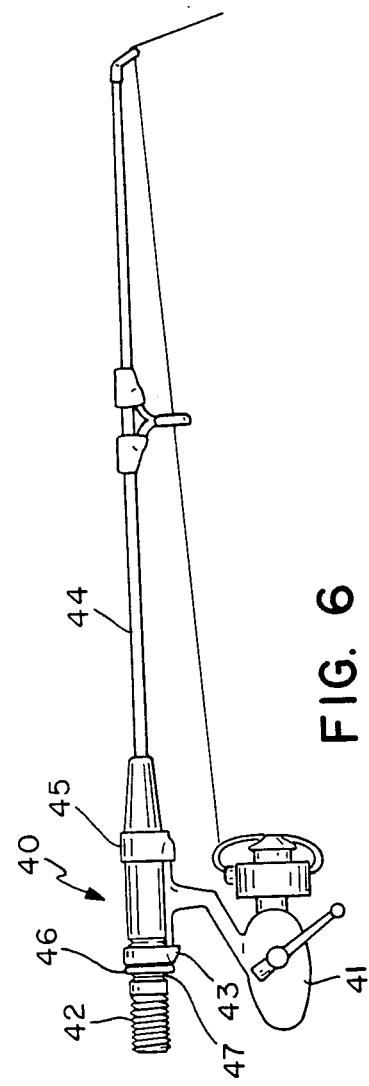

FISHING ROD HANDGRIPS

FIELD OF THE INVENTION

This invention relates generally to fishing rod handgrips and, more specifically, to a fishing rod handgrip that can be removed from a fishing rod and used as a fillet knife with the handgrip operable to be installed on either a summertime fishing rod or a wintertime fishing rod.

BACKGROUND OF THE INVENTION

The concept of fishing rod handgrips for use on fishing rods is well known in the art. Generally, the fishing rod hand grips have a straight handgrip or a curved handgrip with a opening to insert the user's hand. Fisherpersons, particularly those who backpack into a remote region or those who travel with an intent to spend some time fishing, like to proceed with a minimum amount of fishing equipment. One of the items a fisherperson needs is a fishing rod and a sharp fillet knife to clean the fish. The present invention provides an improvement to a fishing rod handgrip that includes a fillet knife blade on a removable handgrip that permits the fillet knife blade to be used in the conventional manner for filleting fish. When the knife is not in use the person can attach the handgrip to either a winter or summertime rod to permit one to use the handgrip in the conventional manner of a fishing rod handgrip in either the summer or the winter.

DESCRIPTION OF THE PRIOR ART

The concept of an improved fishing handgrip is shown in my U.S. Pat. No. 4,796,373 which shows a fishing rod handgrip having a handle that is easier for the fisherperson to grasp and is also well suited for mass production.

The U.S. Pat. No. 4,027,419 shows a fishing rig that shows a fishing rod handle having a tackle box in the handle of the fishing rod with the tackle box having a pivoting cover to confine the fishng tackle in the handle tackle box.

BRIEF DESCRIPTION OF THE DRAWINGS

FIG. 2 shows an exploded perspective view of my handgrip detached from a fishing rod;

FIG. 3 shows a front view of my handgrip in use as a fillet knife;

FIG. 4 shows a front view of my handgrip of FIG. 3 held in a different orientation;

FIG. 5 shows a front view of a summertime fishing rod for attachment to my handgrip;

FIG. 6 shows a front view of a wintertime fishing rod for attachment to my handgrip;

SUMMARY OF THE INVENTION

Briefly, the present invention comprises a fishing rod handgrip that incorporates a folding knife blade and knife guard in the handle of the fishing rod handgrip with the handgrip having an elongated slot to shield the knife blade and a threaded member to permit the attachment or detachment of the fishing rod handgrip to a fishing rod to enable the user to use the fishing rod and handgrip in a conventional manner as a fishing rod or to remove the handgrip from the fishing rod and use the handgrip as a fillet knife for cleaning fish.

DESCRIPTION OF THE PREFERRED EMBODIMENT

Figure 1:
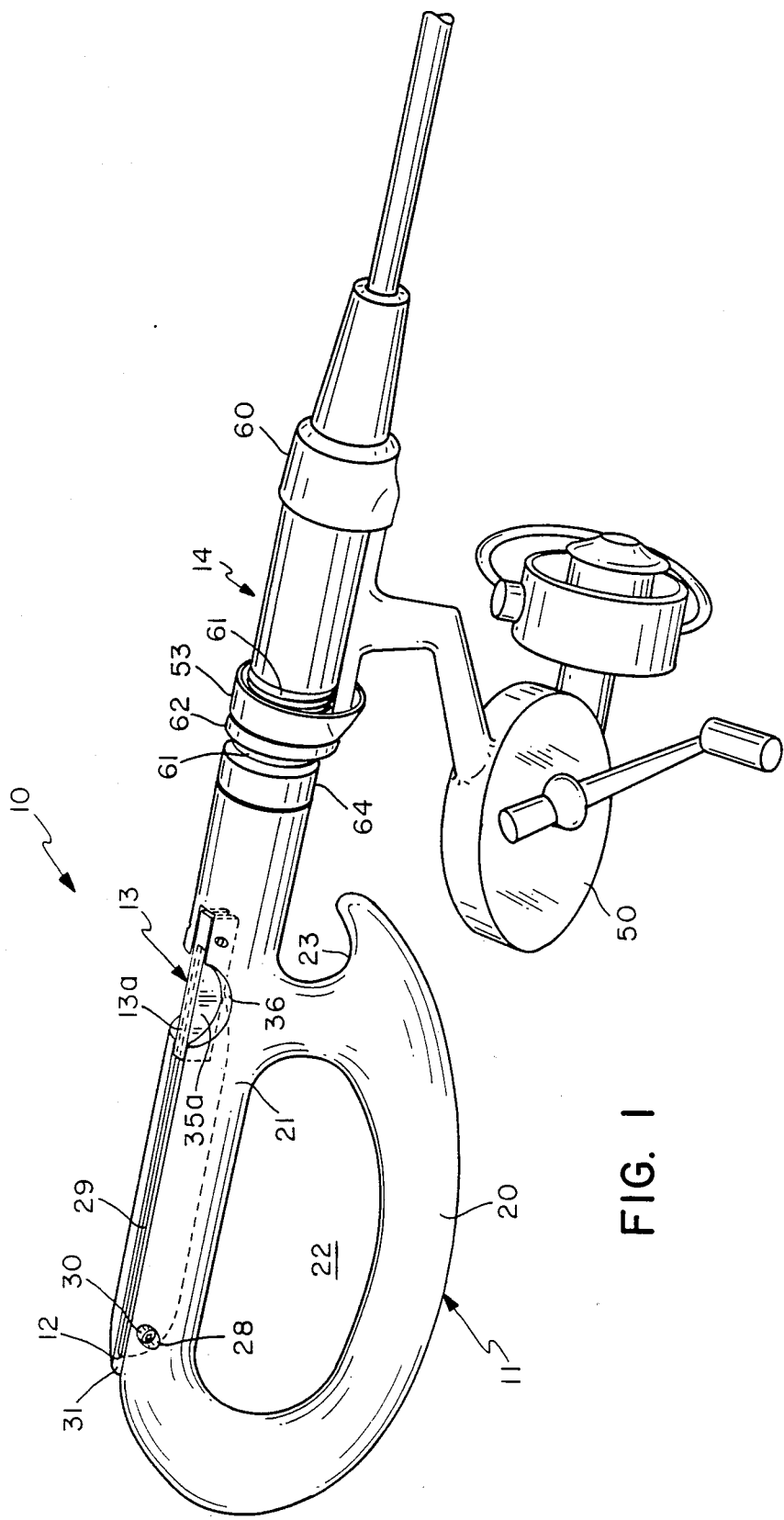
FIG. 1 shows a perspective view of my handgrip and fishing rod in the fishing position.

Referring to FIG. 1 and FIG. 2 reference numeral 10 generally identifies the improved fishing rod handgrip of the present invention. Handgrip 10 comprises an elliptical shaped handle 11, a pivotable knife blade 12, and a pivotable knife blade guard 13. FIG. 1 shows pivotable knife blade 12 in the closed position with knife blade 12 being shielded by handgrip 10 so that handgrip 10 can be used like a conventional handle for a fishing rod 14. FIG. 2 shows handgrip 10 detached from fishing rod 14 and knife blade 12 partially opened to permit a person to use handgrip 10 as a handgrip 10 as a handle for knife blade 12. Handle 11 includes two sections, a lower curved finger guard section 20 that joins with an upper straight section 21 to form a hand opening 22 for a user to insert his or her fingers through the opening 22 and around upper section 21. Handle 11 permits the fisherperson to comfortably and firmly grasp upper section 21 with the palm of the hand and at least four fingers. If desired the fisherperson can insert one finger into a finger guard 23 located at the front section of fishing rod handgrip 10. Handle upper straight section 21 has a general symmetrical cylindrical shape with a hand opening 22 sufficiently large so that the user can grasp upper section 21 from one direction as a fishing rod handle and then reverse the handle and grip it from the opposite side as a knife handle. In addition the upper or the lower section that the user grasps is substantially straight so that the user can comfortably grip the upper section 21 as shown in FIG. 3 or the top section 20 as shown in FIG. 4.

Upper section 21 includes female threads that connect to male threads 52 on a summertime fishing rod 14 or to male threads 42 on a winter time fishing rod 40 (FIG. 6). A feature of placing the female threads on the handgrip 10 rather than on the fishing rod is that when the person uses the handgrip as a knife there are no sharp protruding threads to catch or injure the fisherperson. Summertime fishing rod 14 is shown in FIG. 5 with an open faced spinning reel 50 attached to the butt of rod 14 through a rear hood 53 and a front hood 60 that are held in position by an annular lock ring 62 that engages male threads 61 on the butt of rod 14. Also attached to the butt of rod 14 is the longer summertime fishing rod tip 54. The shorter conventional jig type winter fishing rod 40 is shown in FIG. 6 with a winter time reel 41 attached to the butt of rod 40 with a front hood 45 and a rear hood 43 that are held in place by a a locking ring 46 that engages male threads 47. Attached to one end of the butt of rod 40 is a shorter jig rod tip 44. With the present invention either summertime fishing rod 14 or wintertime fishing rod 40 can be connected to my fishing rod handgrip 11 since either male threads 52 or 42 can form threaded engagement with female threads 24 in handgrip 10.

FIG. 2 shows my fishing rod handgrip 10 separated from fishing rod 14 with knife blade 12 and knife blade guard 13 in the partially open position. Knife blade 12 is pivotally mounted in the rear of upper section 21 of handle 11 through a pivot pin 30 that extends through opening 28 in one end of knife blade 12. Knife blade 12 has a straight cutting edge 27, a curved cutting edge 26 that forms a pointed tip 25 on the end of knife blade 12. A conventional locking mechanism (not shown) locks knife blade 12 in the open position when blade 12 is folded open. Located in handle upper section 21 is an elongated U shaped slot 31 that permits knife blade 12 to pivot completely within upper section 21. That is, when knife blade 12 is in the folded condition as shown in FIG. 1 the back edge 29 is located completely within handle 11 so as not to interfere with the use of the handgrip as a handle for a fishing rod.

Located in elongated slot 31 in upper section 21 is a U shaped pivotable knife blade guard 13 that is pivotally connected to upper section 21 through a pivot pin 33 extending through a hole 39 in one end of knife blade guard 13. Knife blade guard 13 is preferable made of a polymer plastic material and comprises an elongated U shaped member having a first side member 35 connected to a top 13a and a second side member 35 connected to top 13a to form the U shaped pivotable knife guard 13 that folds into slot 31 to fit snugly over the pointed end 25 of knife blade 12 to prevent the user from accidentally sticking themselves on the knife blade tip 25. In the closed position the knife blade guard 13 extends partially along the top edge 29 of knife blade 12 and is held in place by the forming of a frictional contact between knife guard 13 and elongated slot 31. That is, Knife guard 13 has sufficient width that sides 35 and 34 frictionally engage the sides of elongated slot 31 to prevent the knife guard 13 from accidentally opening during the casting motion employed as a user fishes. FIG. 1 shows that knife blade guard 13 is located in and shielded by slot 31 so that knife blade guard 13 and knife blade 12 are recessed in the handle and do not interfere with the use of my handgrip as a fishing rod handle.

In order to provide for ease in opening knife blade 12 handle upper section 21 includes a pair of curved finger relief areas 36 and 37 which extend into opposite faces of handle section 21 to provide for exposure of a section 35a of knife guard blade 13 when the knife blade guard is in the closed position FIG. 1 shows knife blade guard 13 in the closed position with a portion of knife blade guard 13 exposed to reveal the region 35a where the user can grasp the knife blade guard 13 with the finger and thumb to permit the user to pivot the knife blade guard 13 clockwise to the open position as shown in FIG. 2. That is, the frictional contact between knife guard 13 and the sides of elongated slot 31 is sufficiently strong so as to keep the knife blade guard in the slot during the normal casting motion but sufficiently weak so that a user can grasp knife guard 13 with the finger and thumb to rotate knife guard 13 to the open position. Once the knife blade guard 13 is opened the user can grasp the end of knife blade 12, which is exposed in the relief areas 36 and 37, and pivot knife blade 12 to the fully open position shown in FIG. 3 and FIG. 4.

FIG. 3 and FIG. 4 illustrates different hand positions of my handgrip with knife blade 12 in the open position for filleting a fish or the like.

Figure 7:
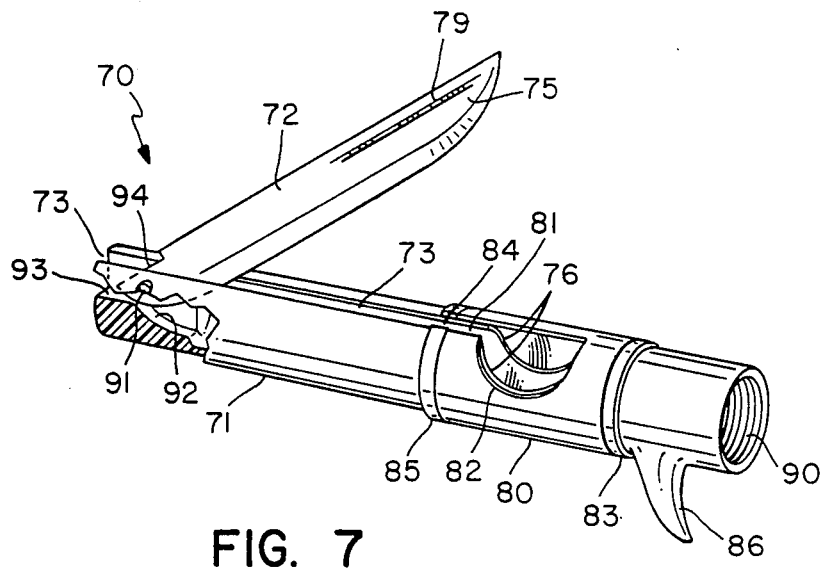
FIG. 7 shows a perspective view of an alternate embodiment of my invention in the partially open position.

FIG. 7 shows an alternate embodiment of my invention comprising a handgrip 70 having a cylindrical handle 71 that a user can comfortably grasp in one's hand from a number of different orientations. Located in the front portion of handle 71 is a finger guard 86 that a user can use when using my handgrip as a handle of a fishing rod. Finger guard 86 is located sufficiently far forward on handle 71 so that is does not interfere in the use of handle 71 as a handle for a knife blade 72. Located in the handle 71 is an elongated U shaped slot 73 that holds a pivoting knife blade 72 through a pivot pin 91 extending through handle 71 and knife blade 72. Located on the opposite end of handle 71 is a set of female threads 90 for engaging a fishing rod and a finger guard 86. Located between the end of the handles is a circular sleeve 80 that forms a cylindrical rotational knife blade guard. Circular sleeve 80 is preferably made of a material such as polymer plastic. Sleeve 80 frictionally fits around the cylindrical handle 71 and requires the user to grasp and rotate the sleeve with his or her fingers. The frictional resistance to turning prevents the knife guard from accidentally opening when using my handgrip as the handle of a fishing rod.

FIG. 7 shows knife sleeve guard 80 in the open position with a knife blade slot 81 facing upward and in alignment with an elongated slot 73 located in handle 71. In addition a cutaway area 82 in sleeve guard 80 is located to align with the relief areas 76 formed in handle 71. When knife blade guard 80 is in the position as shown in FIG. 7. the end portion of knife blade 72 can be engaged by the user by grasping on a groove 79 that extends into relief area 75. While sleeve guard 80 is held in frictional rotational engagement with handle 71 I also provide for retaining rings 84 and 85 which are secured to handle 71 at opposite ends of sleeve guard 80 to longitudinal hold sleeve guard 80 in proper longitudinal and rotational position on handle 71. Retaining ring 85 includes a slot 84 to permit the knife blade 72 to pivot through as the knife blade is opened or closed.

Figure 8:
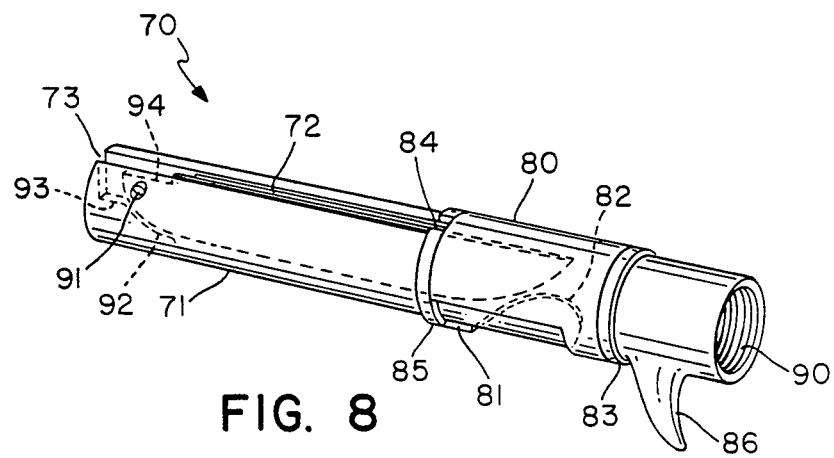
FIG. 8 shows a perspective view of the invention of FIG. 7 in the closed condition.

FIG. 8 shows sleeve guard 80 rotated to the closed position with a portion of the sleeve extending over knife blade 72 to prevent knife blade 72 from accidentally injuring the user when the handgrip is used as a handle on a fishing rod. The embodiment of FIG. 7 and FIG. 8 is similar to the embodiment of FIG. 1 and FIG. 2 in that the knife blade guard 80 does not interfere with the use of my handgrip as a handle for a fishing rod. In addition the knife blade 72 is recessed within the handle 71 to shield the knife blade from the user when using my handgrip as part of a fishing rod. Sleeve guard 80 forms sufficient frictional contact between handle 71 so that it requires the user to grasp and twist knife guard 80 with the user's thumb and forefinger to rotate the knife blade guard to either the open or closed position. FIG. 7 and FIG. 8 also reveal a curved support surface 92 that is located in the end of the handle to form a closed rest blade 72 to keep the sharpened edge of blade 72 from becoming dull by engagement with the bottom of slot 73.

Figure 9:
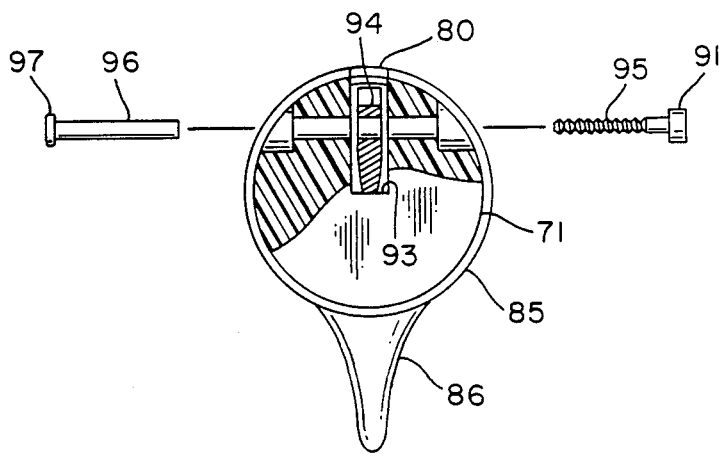
FIG. 9 shows an exploded, partial sectional end view of the handgrip of FIG. 8.

FIG. 9 shows an end view of my handgrip 70 comprising a knife blade pivot pin 91 having a threaded section 95 for engaging a female threaded section in smooth shank 96. FIG. 9 reveal a flat knife support surface 93 that engages a flat knife ledge 94 on knife blade 72. The use of the smooth shank 96 permits the knife blade to pivot about the shank for engagement of knife ledge surface 94 with surface 93. That is, knife blade support surface 93 holds knife blade 72 in the open extended position so that a user can use the handgrip and the knife to clean a fish or the like. Thus the knife curved knife blade surfaces 92 prevents the knife blade sharpened edge from closing against a surface that would dull the edge and the knife blade surface 93 prevents holds the knife in the open position with the knife blade extending straight out from the handgrip.

I claim:

1. A fishing rod handgrip that the user can remove from a fishing rod and use as knife for filleting fish comprising:

a handle having an upper section with a first end and a second end, said upper section having a cylindrical section for the user to comfortably grasp with the user's hand from at least two directions, a lower section forming an opening between said upper section and said lower section so that the user's hand can be inserted around said cylindrical section, said cylindrical section including a knife blade pivotable mounted in said handle to permit the user to fold said knife blade out from said handle to permit the user to use said fishing rod handgrip as a knife by grasping either said upper section or said lower section and to permit the user to fold said knife blade into said handle to use said fishing rod handgrip as a handle for a fishing rod.

2. A fishing rod handgrip that permits the user to attach a fishing rod to the handgrip to permit the user to use the handgrip as part of a fishing rod or to detach the handgrip from the fishing rod to use the handgrip as a knife handle comprising:

a handle having a first end and a second end, said first end including means for removable attachment of said handle to a fishing rod, said handle including a body portion of sufficient size so that a user can grasp said body portion in one hand, said handle having a symmetrical shape so that a user can comfortable grasp said handle from different orientations, said handle including an elongated slot for receiving and shielding a knife blade;

a knife blade, said knife blade pivotable mounted in said elongated slot of said handle; and a knife blade guard, said knife blade guard comprising a protective member for extending over at least a portion of said knife blade to prevent said knife blade from accidentally injuring the user when the user is using said handgrip as a fishing rod.

3. The fishing rod handgrip of claim 2 wherein said knife blade guard comprises a circular sleeve that frictional fits on said handle, said circular sleeve having a knife access area, said circular sleeve rotatable mounted on said handle to permit a user access to said knife blade by rotation of said circular sleeve to thereby permit the user to position said knife blade in an open position on said handgrip.

4. The fishing rod handgrip of claim 3 wherein said circular sleeve has a first end and a second end and said circular sleeve is held from longitudinal displacement by retaining rings located on said handle at opposite ends of said circular sleeve.

5. The fishing rod handgrip of claim 4 wherein said circular sleeve frictionally engages said handle to hold said circular sleeve in position when using said handgrip as a fishing rod or as a fillet knife.

6. The fishing rod handgrip of claim 4 wherein said handle has a cutaway area to permit a user to insert one's finger therein to open said knife blade.

7. The fishing rod handgrip of claim 4 wherein said circular sleeve has a slot therein to permit said knife blade to pivot through said slot when said knife blade is opened.

8. The fishing rod handgrip of claim 4 wherein said knife blade includes a groove for a user to grasp said knife blade with a fingernail to permit the user to pivotally open said knife blade in said handgrip.

9. The fishing rod handgrip of claim 4 wherein said knife blade includes a cutting edge and a knife ledge and said handgrip includes a first surface for engaging said knife ledge to support said knife blade in an open position;

a curved support surface located in said handgrip to support a portion of said knife blade in a position that prevents said cutting edge from becomming dull from contact with said handgrip; and a pivot pin extending through said handgrip to pivotally support said knife blade in said handgrip.

10. An improved fishing rod handgrip for use as a handle of a fishing rod or as a handle of a knife comprising:

a handle having an upper section and a lower section, said upper section having a first end and a second end for attaching said handle to a summertime fishing rod or a wintertime fishing rod, said handle including a knife blade and a slot for mounting said knife blade in said handle, said knife blade pivotable mounted in said first end of said upper section to permit said knife blade to be moved from a closed position to to an open position so that when said knife blade is in a closed position said knife blade is confined in said upper section and when said knife blade is in an open position for use said knife blade extends outward from said upper section to provide a knife blade that can be used for filleting fish or the like, said handle including a U shaped knife blade guard that has an opening for fitting over at least a portion of said knife blade, said knife blade guard pivotable mounted on said second end of said upper section to permit said knife blade guard to fold over at least a portion of said knife blade to protect the user from accidentally injuring the user when the user uses said handgrip as a fishing rod handgrip, said knife blade guard forming frictional contact with said slot so that said knife blade guard remains in position when said handgrip is used as a handle on a fishing rod, said upper section including a relief area to permit the user to grasp said knife blade to pivot said knife blade to an open position.

11. The fishing rod handgrip of claim 10 wherein said knife blade guard is made of a polymer plastic.

12. The fishing rod handgrip of claim 11 wherein said second end for attaching said handle to a summertime fishing rod or a wintertime fishing rod comprises a threaded female member for engaging a threaded male member on a summertime fishing rod or a wintertime fishing rod.

13. The fishing rod handgrip of claim 12 wherein said handle includes an elongated U shaped slot for holding said knife blade and said knife blade guard in said handle when said handgrip is used as a fishing rod handle.

14. The fishing rod handgrip of claim 13 including a pivot pin pivotable mounting said knife blade guard in said elongated slot.

15. The fishing rod handgrip of claim 14 wherein said knife blade guard includes U shaped member that extends partially along said slot to cover at least a portion of said knife blade.

* * * * *